Figure 1:
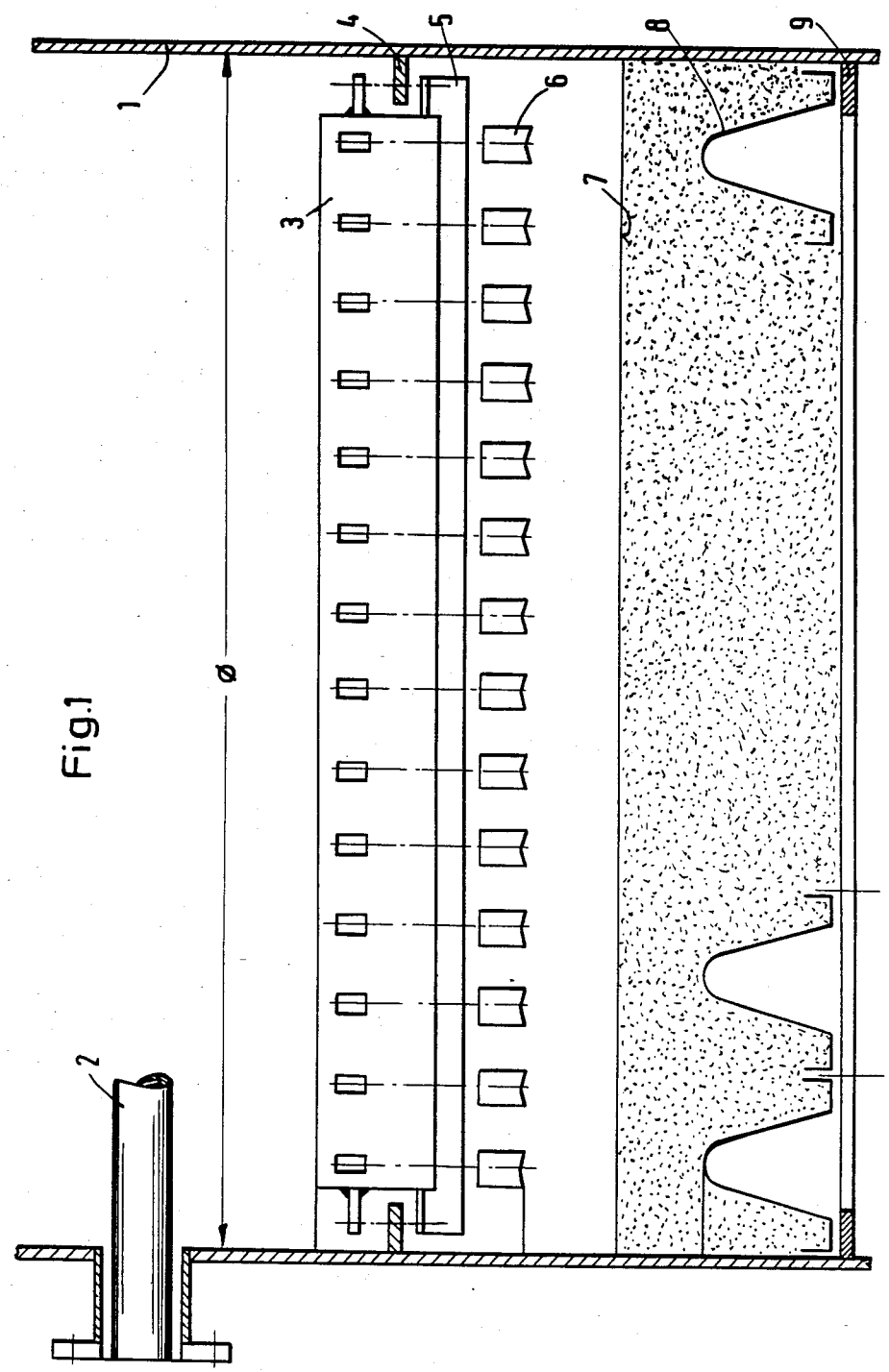

United States Patent [19]

Ullrich et al.

[11] Patent Number: 4,648,972

[45] Date of Patent: Mar. 10, 1987

[54] LIQUID DISTRIBUTOR FOR MATERIAL EXCHANGE COLUMNS

[75] Inventors: Hansjürgen Ullrich, Bochum; Werner Geipel, Steinwiesen, both of Fed. Rep. of Germany

[73] Assignee: Paul Rauschert GmbH & Co. Kg, Pressig, Fed. Rep. of Germany

[21] Appl. No.: 683,812

[22] Filed: Dec. 20, 1984

[30] Foreign Application Priority Data

Dec. 23, 1983 [DE] Fed. Rep. of Germany ....... 3346857

[51] Int. Cl.⁴ .......................................... B01D 23/20
[52] U.S. Cl. ..................................... 210/541; 210/291
[58] Field of Search ................ 210/289, 291, 541, 542

[56] References Cited

U.S. PATENT DOCUMENTS 4,094,790 6/1978 Schmidt ............................... 210/291
4,098,695 7/1978 Novotny .............................. 210/289

Primary Examiner—Ivars Cintins
Attorney, Agent, or Firm—Donald C. Studley; Michael L. Dunn

[57] ABSTRACT

The present invention relates to a distributor for distributing a liquid in an exchange column. The distributor comprises at least one predistributor means positioned to receive a liquid feed and a plurality of distributor means having substantially straight longitudinal side walls and open top portions. The interior and exterior of the longitudinal side walls of the predistributor means are covered with a wettable, open-pore material. In operation the liquid feed flows from the predistributor means into the interior of the distributor means, through the open-pore material, exiting this open-pore material on the exterior of the distributor means. In this manner an improved, even distribution of the liquid feed within the exchange column is obtained.

3 Claims, 3 Drawing Figures

LIQUID DISTRIBUTOR FOR MATERIAL EXCHANGE COLUMNS

It is known, in material exchange columns such as fractionating columns, stripper columns, gas scrubbers and the like, for a liquid distributor to be provided at the upper end of the column, the distributor being intended to distribute the liquid which is to be introduced at the head of the column, more or less uniformly over the entire cross-section of the column before the liquid comes into material exchange, for example by passing into a charge of filling material.

Known liquid distributors of that kind comprise overflow channels which are arranged in parallel relationship to each other and into which the liquid is introduced by way of a predistributor channel. However, the overflow of such channels is difficult to control and very slight deviations in the overflow edges from the horizontal cause the liquid to overflow preferentially at a point on the respective channel, thus giving distribution of liquid which is not uniform over the cross-section of the column.

It is also already known to arrange wire needles on the overflow channels, in order to produce more uniform distribution of the liquid by means of the capillary effect between two wires or between a wire and the wall of the overflow channel. However, liquid distributors of that kind require an expensive assembly operation as the wires must be very carefully adjusted. Furthermore, with such liquid distributors, a certain minimum through-put of liquid is required, as otherwise they do not function. Therefore, liquid distributors of that kind cannot be used for exchange columns which are to receive small amounts of liquid per unit of time. In addition, such liquid distributors, with wire needles, are susceptible to fouling so that replacement is required relatively frequently.

Therefore, the underlying object of the present invention was to provide liquid distributors for material exchange columns, which are also suitable for a low rate of liquid through-put and which are of maximum simplicity in regard to manufacture and assembly.

The liquid distributor for material exchange columns, according to the invention, which achieves that object and which comprises at least one predistributor means connected to a feed conduit, and a plurality of distributor means into which the predistributor means opens and which have at least one liquid outlet opening, is characterised in that a body comprising an absorbent open-pore material which can be wetted by the liquid, having an internal coherent pore structure, is so arranged, in conjunction with the liquid outlet openings, that substantially the whole liquid issuing from the liquid outlet openings passes the internal pore structure of the body before being delivered to the material exchange column.

The advantage of such a liquid distributor according to the invention is that it operates completely independently of the liquid through-put, that is to say, it operates both at very high and also very low rates of liquid through-put, while ensuring uniform distribution of the liquid over the cross-section of the exchange column. The body of absorbent material can be easily assembled and replaced so that even in the event of severe fouling which clogs up the pore structure, the exchange column has to be taken out of operation for only a very short period of time in order to replace the absorbent material. The costs are low in comparison with the known liquid distributors so that the subject of the invention combines minimum cost with maximum effect.

The body of absorbent material, which is connected to the liquid outlet openings, may be of widely varying nature in regard to the substance used and in regard to the shape and arrangement thereof. Broadly speaking, the absorbent materials that may be used are preferably woven or non-woven textile fibre materials, foams or ceramic or oxide-ceramic sintered materials. In that connection, non-woven textile fibre materials may be fibre fleeces of any kind such as random-type fibre fleeces or needle fleeces, fibre bunches, fibre strands or the like. The composition of such materials, in regard to the substances used, depends on which substances and conditions such as temperatures are to be found in the column in which the liquid distributor is to be employed. It will be appreciated that the materials must be so selected that the substances in the column do not break up or loosen the absorbent material and the temperatures obtaining do not cause softening or melting of the material as that would mean that the internal pore structure and absorption capability would be lost and the substances would be contaminated in the column. When those conditions are observed, any possible textile materials may be considered per se, more specifically materials which occur naturally as well as synthetic materials such as wool, cotton, polyester, polyacrylonitrile, polypropylene, polyamide, polytetrafluoroethylene or polyvinylchloride.

Any foamable plastics materials may in themselves also be considered as the foam plastics, insofar as they can withstand the reaction conditions in the column.

The materials in respect of which corrosion phenomena are least to be feared, except by virtue of inorganic acids or bases, are the ceramic or oxide-ceramic sintered materials of widely varying compositions. The man skilled in the art is aware of the nature of such ceramic or oxide-ceramic sintered materials. When reference is made herein to liquid outlet openings of the distributor means, that may be a single opening such as in the case of an upwardly open channel or a pipe having a longitudinal slot, or it may be a plurality of openings which are disposed at a spacing from each other and which are for example provided laterally, in a channel or a pipe.

Depending on the configuration of the distributor means and the liquid outlet openings thereof, the liquid may be sucked out of the distributor means by the absorbent material or may be pressed into the body comprising the absorbent material by applied pressure or by the hydrostatic pressure in the distributor means. Irrespective of the way in which the liquid passes into the internal pore structure of the absorbent material, it is uniformly distributed in that coherent pore structure, which results in the liquid uniformly dripping off over the entire cross-section of the column, in which connection the magnitude of the rate of liquid through-put through the body of absorbent material is completely immaterial.

It is desirable for the body of absorbent material to be provided with projections which act as drip-off means. By means of such projections such as pointed or tip portions or rounded portions, it is possible to produce any required and desired number of drip-off means and thus to provide for finer or coarser distribution of the material which drips off the distributor means, over the cross-section of the column. It is particularly desirable for the lower edge of the body of absorbent material to be of a zig-zag configuration, the tips or points forming the drip-off means.

There is no need for the bodies of absorbent material to extend over the entire length of the distributor means but such absorbent bodies may be disposed at a spacing from each other over that length. However, it will be appreciated that the maximum degree of uniformity of distribution of liquid over the cross-section of the column is achieved when the bodies of absorbent material extend over the entire length of the distributor means.

When reference is made herein to absorbent bodies, they may be of the most widely varying forms. In general however, they will be in the form of flat articles such as for example textile materials, needle felts, fibre fleeces, foam plates or films or flat ceramic mouldings.

If the distributor means are upwardly open distributor channels which are closed at the ends, the body of absorbent material may be laid over the upper edges of the channel in such a way that the absorbent material lies with its drip-off means on the outside of the channel and dips into the liquid in the interior of the channel so that liquid is sucked out of the distributor channel by the material with its internal pore structure, carried over the upper edge to the outside of the channel and drips off at that location. In that arrangement, the absorbent material such as fibre fleece, textile material or the like may be secured to the inside and/or outside of the channels or may lie loosely thereon or may also be disposed at a spacing from the wall of the channel, as by means of spacer members.

If the distributor means are channels or pipes with one or more lateral liquid outlet openings such as longitudinal slots or windows, then the body of absorbent material may either be fitted on the outside of the liquid outlet openings in such a way that the liquid does not go past the bodies but must pass therethrough, or the bodies of absorbent material may project through the liquid outlet openings into the interior of the channels or pipes. When the absorbent bodies are arranged in that way, in addition to the suction effect there is also the fact that the liquid is pressed into the absorbent material under the hydrostatic pressure in the channel or pipe, and is distributed in the internal pore structure of the absorbent material. The above-indicated effect of the liquid being pressed into the absorbent material may be further enhanced by the liquid being pressed into the distributor means under pressure when the distributor means are of a pipe configuration.

Figure 2:
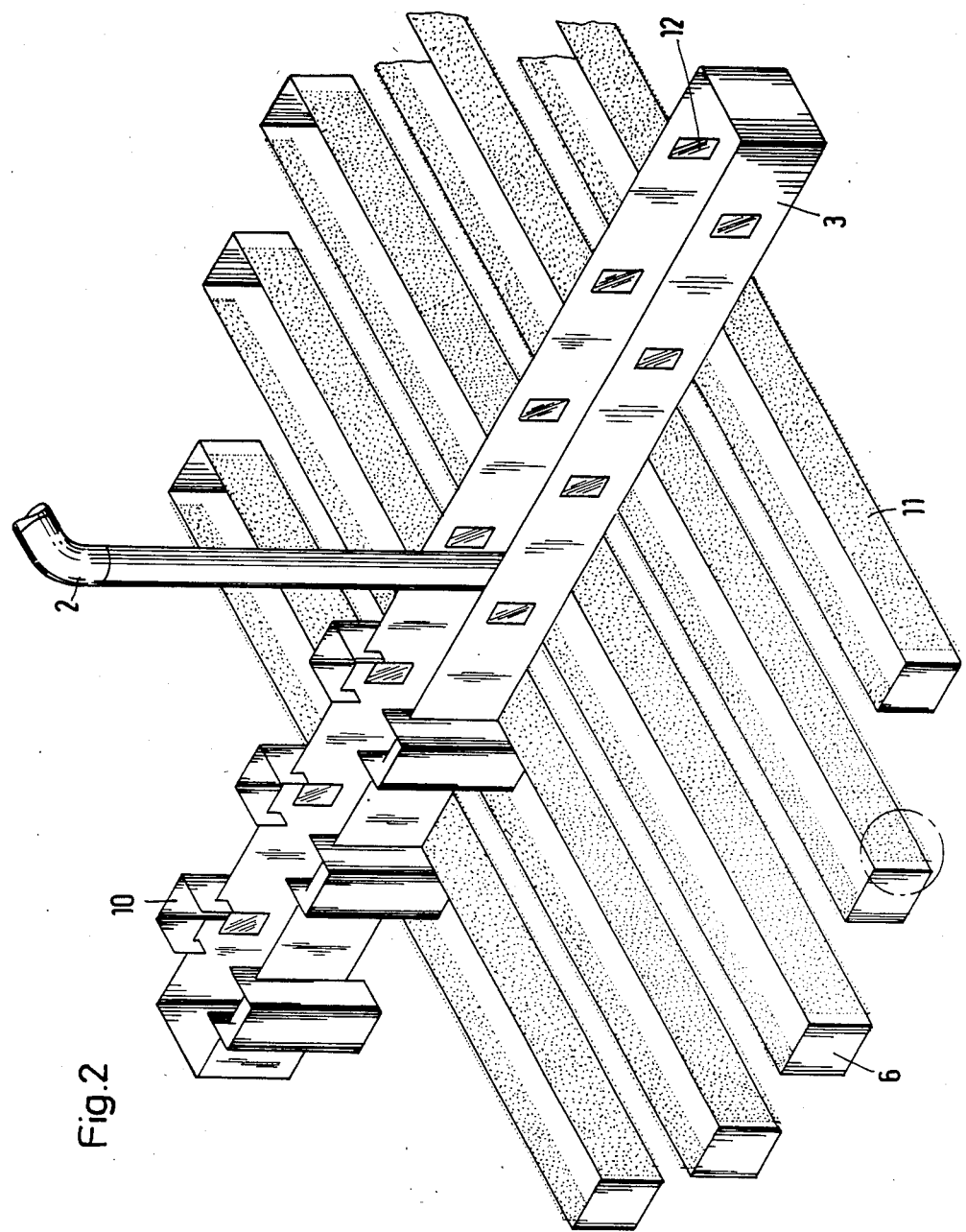
Figure 3:
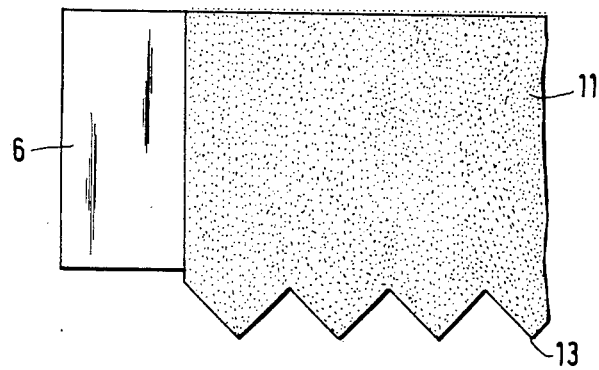

The invention is described in greater detail with reference to the drawings in which:

FIG. 1 shows a perspective view in vertical section through the upper end of a material exchange column with a liquid distributor according to the invention, FIG. 2 shows a partly broken-away perspective view of a part of the liquid distributor shown in FIG. 1, and FIG. 3 shows a plan view on an enlarged scale of the area ringed in FIG. 2, of the side wall of the distributor channel.

FIG. 1 shows the upper part of a material exchange column 1. The liquid is introduced into the liquid distributor through the feed pipe 2 which is shown in broken-away form, the liquid distributor comprising a predistributor 3 and distributor channels 6.

The predistributor 3 is supported on a support ring 4 but is shown in the drawings as being lifted away therefrom.

Disposed below the support ring 4 is the support member 5 for the distributor channels 6 which have substantially straight side walls and a completely open top position, that is, the top portion is substantially entirely free of structure. Distributor channels 6 are disposed beneath the predistributor 3 at a spacing from each other and in substantially parallel relationship to each other over the entire cross-section of the exchange column 1. Associated with each distributor channel 6, in the predistributor 3, is a window 12 from which liquid overflows into the distributor channel 6.

From the distributor channels 6, the liquid, being distributed over the entire cross-section of the column, drips on to the filling bodies 7 therein. The fill 7 lies on the support grid 8 which is shown in diagrammatic form and which in turn is carried on the support ring 9.

As shown in FIG. 2 in regard to the rearward part of the predistributor 3, disposed at each window 12 in the predistributor 3 is a baffle plate 10 which guides the liquid issuing from the window 12, into the distributor channel 6 which is disposed therebelow.

According to the invention, at both longitudinal walls thereof, the distributor channels 6 are covered with a needle felt 11 which is secured to the outside wall by adhesive, which bridges, or is bent over the upper edge of the channel, and which projects into the interior of the distributor channel 6 to such a distance that the lower edge is below the normal level of liquid therein.

The portion of the side wall of a distributor channel 6, which is ringed in FIG. 2, is shown in FIG. 3, illustrating that the needle felt 11 projects beyond the lower edge of the side wall of the distributor channel 6 and is cut out in a zig-zag configuration at its lower edge. Each point or tip 13 in that arrangement forms a point at which the liquid drips off.

The distributor channels 6, like the predistributor 3 illustrated, may also be provided with lateral windows which are covered at the outside with the absorbent material. The distributor means may also be for example pipes with lateral slots or windows.

We claim:

1. A distributor for distributing a liquid in an exchange column which comprises:
   (a) at least one predistributor means positioned to receive a liquid feed,
   (b) a plurality of distributor means having substantially straight side walls and completely open top portions, said distributor means positioned to receive liquid from said predistributor means, and
   (c) a body of wettable, open-pore material having an internal coherent pore structure positioned along the outside and inside longitudinal walls of said distributor means, said open-pore material bridging said outside and inside walls and positioned to receive substantially entirely all of the liquid from the distributor means and distribute said liquid within an exchange column.

2. A distributor according to claim 1 wherein the body of open-pore material is selected from a woven or non-woven textile fibre material, a plastics foam or a ceramic or oxide-ceramic sintered material.

3. A distributor according to claim 1 wherein the lower edge of the body of open-pore material has spaced-apart point portions.

* * * * *